(12) United States Patent
Dohnal

(10) Patent No.: US 9,054,522 B2
(45) Date of Patent: Jun. 9, 2015

(54) ON-LOAD TAP CHANGER

(75) Inventor: Dieter Dohnal, Lappersdorf (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 50 days.

(21) Appl. No.: 13/643,166

(22) PCT Filed: Feb. 23, 2011

(86) PCT No.: PCT/EP2011/000852
§ 371 (c)(1),
(2), (4) Date: Dec. 6, 2012

(87) PCT Pub. No.: WO2011/141076
PCT Pub. Date: Nov. 17, 2011

(65) Prior Publication Data
US 2013/0170079 A1    Jul. 4, 2013

(30) Foreign Application Priority Data
May 8, 2010   (DE) .......................... 10 2010 019 949

(51) Int. Cl.
*H02H 7/04*      (2006.01)
*H02H 7/055*    (2006.01)
*H01F 29/04*    (2006.01)
*H01H 9/00*     (2006.01)

(52) U.S. Cl.
CPC ............... *H02H 7/055* (2013.01); *H01F 29/04* (2013.01); *H01H 9/0038* (2013.01)

(58) Field of Classification Search
CPC ..... H01F 29/04; H01H 9/0016; H01H 9/0027
USPC ........................................................... 361/40
See application file for complete search history.

(56) References Cited

U.S. PATENT DOCUMENTS 8,519,682 B2 * 8/2013 Oates et al. ................... 323/258

FOREIGN PATENT DOCUMENTS

DE         102007004530 A       9/2007

* cited by examiner

*Primary Examiner* — Thienvu Tran
*Assistant Examiner* — Tien Mai
(74) *Attorney, Agent, or Firm* — Andrew Wilford

(57) ABSTRACT

The invention relates to an on-load tap changer for switching among winding taps of a step transformer without interruption. According to the invention, in each auxiliary current branch of the on-load tap changer, which operates with vacuum switching tubes as switching elements, additional switches are provided in series with the vacuum switching tubes and the respective winding tap. Said additional switches cause a complete galvanic isolation of the vacuum switching tubes in the auxiliary current branches in steady-state operation.

4 Claims, 1 Drawing Sheet

ON-LOAD TAP CHANGER

CROSS REFERENCE TO RELATED APPLICATIONS

This application is the US-national stage of PCT application PCT/EP2011/000852 filed 23 Feb. 2011, published 17 Nov. 2011 as WO2011/141076, and claiming the priority of German patent application 102010019949.4 itself filed 8 May 2010.

FIELD OF THE INVENTION

The invention relates to an on-load tap changer for uninterrupted switching between winding taps of a tapped transformer.

BACKGROUND OF THE INVENTION

On-load tap changers have been known for many years; although they previously had mechanical contacts, which operate in oil, for load changeover, numerous more recent apparatus have vacuum switching tubes. The use of vacuum switching tubes for load changeover prevents formation of arcs in the oil and thus contamination of the load changeover switch oil. It thus allows lengthened maintenance intervals.

On-load tap changers with vacuum switching tubes are known with numerous different circuits with two, three, four or even more switching vacuum switching tubes per phase. A typical circuit, here with three vacuum switching tubes per phase, is shown by DE 10 2007 004 530 A1.

However, in various cases of use of such known on-load tap changers with vacuum switching tubes for regulation of power transformers a high surge-voltage strength of up to 100 kV and significantly above that is required. Such undesired surge voltages, the height of which is substantially dependent on the construction of the tapped transformer and the winding parts between the individual tap steps, are on the one hand lightning surge voltages that result from lightning strikes in the mains. On the other hand, switching surge voltages can also occur that are caused by unpredictable switching surges in the mains to be regulated. In the case of insufficient surge-voltage strength of the on-load tap changer a transient step short-circuit or undesired disruption of the ceramic or the damping screen of vacuum switching tubes in the load branch not conducting the load current can occur, which not only can cause long-term damage thereof, but also is generally undesirable. This leads in many cases in the design of the switching paths and thus particularly also the vacuum switching tubes to over-dimensioning so that they safely withstand the described voltage load. Not only the small constructional space currently available with modern apparatus, but also the economics as well as serviceability of such vacuum switching tubes have the consequence that such over-dimensioning appears to be disadvantageous.

In order to combat excessive surge-voltage loads it is already known from DE 2357209 A and DE 2604344 to provide protective spark gaps or voltage-dependent resistors between the load branches; however, these means are, in various cases, insufficient and are unable to exclude or completely exclude harmful surge-voltage loads in their effect.

OBJECT OF THE INVENTION

The object of the invention is therefore to avoid such over-dimensioning of the vacuum switching tubes, but still ensure the requisite voltage strength in an on-load tap changer according to the invention.

SUMMARY OF THE INVENTION

This object is fulfilled by an on-load tap changer in which a further, separately actuatable contact is provided in series in each of the at least two auxiliary current branches between the respective winding tap and the respective further vacuum switching tube.

The general inventive idea consists of displacing the described voltage load from the vacuum switching tubes to contact arrangements arranged in series therewith. After successful switching off or switching—depending on the circuit—by the vacuum switching tubes the additional contact arrangements, according to the invention, switching free of current subsequently thereto ensure complete separation of potential. Before the next load changeover, i.e. before switching on the vacuum switching tubes, the potential is connected again in reverse sequence initially by the contact arrangements according to the invention.

The contact arrangements according to the invention can be realized as mechanical contacts directly in the insulating oil, but they can also be realized as further vacuum switching tubes or in semiconductor technology.

BRIEF DESCRIPTION OF THE DRAWING

The invention is explained in the following by way of embodiments, in which.

SPECIFIC DESCRIPTION OF THE INVENTION

Figure 1:
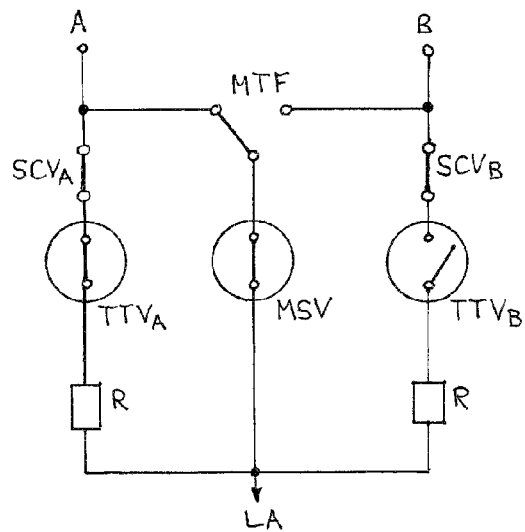
FIG. 1 shows the circuit of a first on-load tap changer according to the invention.

An on-load tap changer, the load changeover switch of which uninterruptedly switches between two winding taps A, B is shown in FIG. 1. The electrical path that in stationary operation conducts the load current is illustrated in the middle. It comprises a first vacuum switching cell MSV and, in series therewith, a mechanical contact MTF that, depending on the switch position, can connect one of the two winding taps A and B with the first vacuum switching cell MSV. Shown on the left and right thereof are the two auxiliary current paths that produce the uninterrupted switching-over of the load current; during the load changeover, they can be briefly connected between the taps and the load shunt LA and temporarily conduct current. They each consist of a further vacuum switching tube $TTV_A$ or $TTV_B$ and, in series therewith, a respective switch-over resistor R.

According to the invention, connected between each of the connectable winding taps A, B and the respective vacuum switching tube $TTV_A$ or $TTV_B$ in the auxiliary current paths in series therewith is a respective contact $SCV_A$ or $SCV_B$ that in stationary operation completely electrically isolates as an auxiliary contact that switches free of current, the vacuum switching tube $TTV_A$ or $TTV_B$ and realizes a separation of potential. A secure protection of these vacuum switching tubes from excess voltages, for example surge voltages, is thus guaranteed in a simple, but effective manner.

Figure 2:
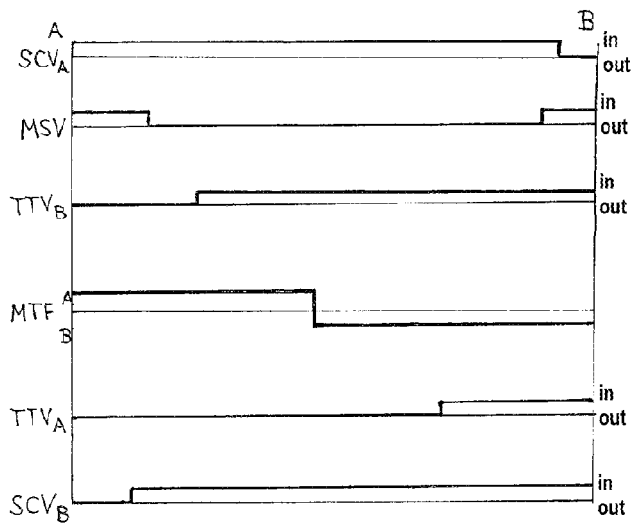
FIG. 2 shows the switching sequence thereof and FIG. 3 shows the circuit of a further on-load tap changer according to the invention.

FIG. 2 shows the actuation sequence of this load changeover switch according to the invention. It can be seen that the contacts $SCV_A$ and $SCV_B$ according to the invention prior to the start of the actual switching-over produce the necessary electrical use of the vacuum switching tube $TTV_A$ or $TTV_B$ in the respective current-conducting auxiliary branch and after the conclusion of the switching-over again separate the potential at the then other auxiliary branch.

Figure 3:
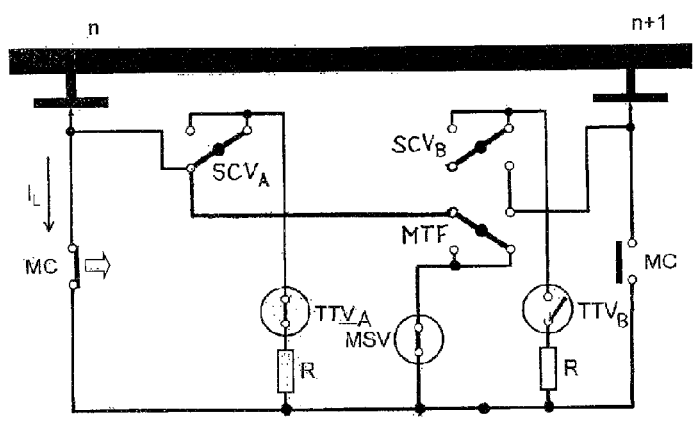

FIG. 3 shows a modified form of embodiment of a load changeover switch according to the invention of an on-load tap changer. In this case, the mechanical contacts $SCV_A$ and $SCV_B$ according to the invention are constructed not as individual contacts, but as changeover contacts. Such an embodiment enables advantageous actuation of these contacts, the function and effect of which does not otherwise change.

It is to be emphasized that the function of the contacts according to the invention, which are provided in an auxiliary current circuit in series with each vacuum switching tube and which in the embodiments are denoted by $SCV_A$ and $SCV_B$, are not bound to a specific circuit or number of vacuum switching tubes. Numerous other circuits are possible and feasible within the scope of the invention.

The invention claimed is:

1. In combination with:
   a transformer having a plurality of taps;
   a load shunt;
   a main vacuum tube switch connected to the load shunt; and
   a selector connected to the main vacuum tube switch and connectable directly one at a time to each of the taps to conduct electricity from the taps to the load shunt, a load changeover switch assembly comprising:
   respective auxiliary branches each connected directly to a respective one of the taps and to the load shunt and each comprising, connected in series with one another:
   a respective resistor;
   a respective auxiliary vacuum tube switch, and
   a respective isolating switch closable to conduct electricity from the respective tap to the load shunt through the respective auxiliary resistor and auxiliary vacuum tube and openable to open-circuit the respective auxiliary branch; and
   control means for, when the selector disconnects from a connected one of the taps and moves toward a selected one of the taps, closing the auxiliary switch of the selected tap and then, when the selector connects to the selected tap, opening the auxiliary switch of the selected tap.

2. The load changeover switch according to claim 1, wherein the isolating switches are mechanical contacts in oil.

3. The load changeover switch according to claim 1, wherein the isolating switches are changeover contacts.

4. The load changeover switch according to claim 1, wherein the isolating switches are constructed as further vacuum switching tubes.

* * * * *